United States Patent
Chouai et al.

(10) Patent No.: US 8,961,768 B2
(45) Date of Patent: *Feb. 24, 2015

(54) METAL CONTAINING INTEGRATED ELECTROCOAT FOR BETTER CORROSION RESISTANCE

(75) Inventors: Abdellatif Chouai, Lake Jackson, TX (US); Timothy S. December, Rochester Hills, MI (US); Robert D Schiller, South Lyon, MI (US)

(73) Assignee: BASF Corporation, Wyandotte, MI (US)

(*) Notice: Subject to any disclaimer, the term of this patent is extended or adjusted under 35 U.S.C. 154(b) by 967 days.

This patent is subject to a terminal disclaimer.

(21) Appl. No.: 12/345,025

(22) Filed: Dec. 29, 2008

(65) Prior Publication Data

US 2010/0167089 A1 Jul. 1, 2010

(51) Int. Cl.
C25D 13/06 (2006.01)

(52) U.S. Cl.
USPC ............................ 204/505; 523/415; 524/612

(58) Field of Classification Search
USPC ................. 524/612, 500; 204/489, 501, 505; 523/415
See application file for complete search history.

(56) References Cited

U.S. PATENT DOCUMENTS

| | | | |
|---|---|---|---|
| 2,723,971 A | 11/1955 | Cupery | |
| 3,400,102 A | 9/1968 | Ludington | |
| 3,564,074 A | 2/1971 | Avallone | |
| 4,164,487 A | 8/1979 | Martin | |
| 4,321,335 A | 3/1982 | Arimoto et al. | |
| 4,397,970 A | 8/1983 | Campbell et al. | |
| 4,425,451 A | 1/1984 | Sekmakas et al. | |
| 4,439,593 A | 3/1984 | Kelso et al. | |
| 4,461,857 A | 7/1984 | Sekmakas et al. | |
| 4,487,859 A | 12/1984 | Martino | |
| 4,508,765 A | 4/1985 | Ring et al. | |
| 4,647,647 A | 3/1987 | Haubennestel et al. | |
| 4,692,484 A * | 9/1987 | Roberts .......................... | 523/414 |
| 4,734,467 A | 3/1988 | Yamada et al. | |
| 4,761,337 A | 8/1988 | Guagliardo et al. | |
| 4,762,752 A | 8/1988 | Haubennestel et al. | |
| 4,968,730 A | 11/1990 | Hönig et al. | |
| 4,968,775 A | 11/1990 | Toman et al. | |
| 4,992,516 A | 2/1991 | Schipfer et al. | |
| 4,992,525 A | 2/1991 | Kriessmann et al. | |
| 5,039,721 A | 8/1991 | Schwerzel et al. | |
| 5,070,159 A | 12/1991 | Dietz et al. | |
| 5,086,156 A | 2/1992 | McGrath et al. | |
| 5,095,050 A | 3/1992 | Treybig et al. | |
| 5,130,350 A | 7/1992 | Schwerzel et al. | |
| 5,132,378 A | 7/1992 | Schipfer et al. | |
| 5,141,815 A | 8/1992 | Rickett | |
| 5,264,469 A | 11/1993 | Mysliwczyk et al. | |
| 5,330,627 A * | 7/1994 | Grutter et al. .................. | 204/489 |
| 5,342,901 A | 8/1994 | Kogure et al. | |
| 5,380,816 A | 1/1995 | Sullivan | |
| 5,389,704 A | 2/1995 | Yabu | |
| 5,554,700 A | 9/1996 | Schipfer et al. | |
| 5,635,049 A | 6/1997 | Mysliwczyk et al. | |
| 5,670,441 A | 9/1997 | Foedde et al. | |
| 5,726,249 A | 3/1998 | Barsotti et al. | |
| 5,817,733 A | 10/1998 | Rink | |
| 5,859,095 A | 1/1999 | Moyle et al. | |
| 5,866,259 A | 2/1999 | Harris et al. | |
| 5,908,912 A | 6/1999 | Kollah et al. | |
| 5,972,189 A | 10/1999 | McMurdie et al. | |
| 5,975,874 A | 11/1999 | Daly et al. | |
| 6,025,438 A | 2/2000 | Hinterwaldner et al. | |
| 6,110,341 A | 8/2000 | McMurdie et al. | |
| 6,156,823 A * | 12/2000 | Sikora ........................... | 523/415 |
| 6,174,422 B1 | 1/2001 | Hönig et al. | |
| 6,190,524 B1 | 2/2001 | Kollah et al. | |
| 6,265,079 B1 | 7/2001 | Nishiguchi et al. | |
| 6,333,367 B1 | 12/2001 | Kato et al. | |
| 6,353,057 B1 | 3/2002 | He et al. | |
| 6,436,201 B1 | 8/2002 | Sugita et al. | |
| 6,492,027 B2 | 12/2002 | Nishiguchi et al. | |
| 6,541,120 B1 | 4/2003 | Klein et al. | |
| 6,599,965 B2 | 7/2003 | Lane et al. | |
| 6,617,030 B2 | 9/2003 | Morishita et al. | |
| 6,624,215 B1 | 9/2003 | Hiraki et al. | |
| 6,750,274 B2 | 6/2004 | Gray et al. | |
| 6,777,034 B2 | 8/2004 | Berger et al. | |

(Continued)

FOREIGN PATENT DOCUMENTS

| | | |
|---|---|---|
| DE | 2918610 A1 | 11/1980 |
| DE | 4408865 A1 | 9/1995 |

(Continued)

OTHER PUBLICATIONS

Database WPI Week 198335 Thomson Scientific, London, GB; AN 1983-750925 XP002546648.

(Continued)

*Primary Examiner* — Kishor Mayekar
(74) *Attorney, Agent, or Firm* — Quinn Law Group, PLLC.

(57) ABSTRACT

An aqueous electrodeposition coating composition comprising (a) a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements, and combinations of these and (b) a cathodically electrodepositable binder, the binder comprising an amine-functional phosphorylated resin, provides corrosion protection equivalent to that obtained by the conventional phosphate pretreatment-electrodeposition coating process.

11 Claims, No Drawings

(56) References Cited

U.S. PATENT DOCUMENTS

| | | | |
|---|---|---|---|
| 6,852,824 B2 | 2/2005 | Schwarte et al. | |
| 6,887,526 B1 | 5/2005 | Arit et al. | |
| 6,897,265 B2 | 5/2005 | Algrim et al. | |
| 6,942,902 B2 | 9/2005 | Sapper | |
| 6,994,888 B2 | 2/2006 | Metcalfe | |
| 7,008,998 B2 | 3/2006 | Tazzia et al. | |
| 7,030,185 B2 * | 4/2006 | Tominaga et al. | 524/591 |
| 7,081,157 B2 | 7/2006 | Maze et al. | |
| 7,087,146 B2 | 8/2006 | Grosse-Brinkhaus et al. | |
| 7,163,979 B2 | 1/2007 | Okazaki et al. | |
| 7,268,171 B2 | 9/2007 | Tanaka et al. | |
| 7,300,963 B2 | 11/2007 | Birnbrich et al. | |
| 7,345,101 B2 | 3/2008 | Pawlik et al. | |
| 7,531,074 B2 | 5/2009 | Purdy et al. | |
| 7,674,874 B2 | 3/2010 | Gonzalez et al. | |
| 2003/0004231 A1 | 1/2003 | Ehmann et al. | |
| 2004/0071972 A1 | 4/2004 | Nakajima et al. | |
| 2005/0065243 A1 | 3/2005 | Feola et al. | |
| 2005/0256260 A1 | 11/2005 | Ohrbom et al. | |
| 2006/0025497 A1 | 2/2006 | Ushirogouchi et al. | |
| 2006/0058423 A1 | 3/2006 | Gros et al. | |
| 2006/0127678 A1 | 6/2006 | Pawlik et al. | |
| 2006/0261311 A1 | 11/2006 | Poulet et al. | |
| 2007/0149655 A1 * | 6/2007 | Kawaraya et al. | 523/458 |
| 2007/0244270 A1 | 10/2007 | December et al. | |
| 2007/0275256 A1 | 11/2007 | Ragunathan et al. | |
| 2008/0102214 A1 | 5/2008 | December et al. | |
| 2008/0103268 A1 | 5/2008 | December et al. | |
| 2008/0103269 A1 | 5/2008 | December et al. | |
| 2008/0193644 A1 | 8/2008 | Gonzalez et al. | |
| 2008/0193664 A1 | 8/2008 | Gonzalez et al. | |
| 2008/0194783 A1 | 8/2008 | Gonzalez et al. | |
| 2008/0194843 A1 | 8/2008 | Gonzalez et al. | |
| 2009/0084682 A1 * | 4/2009 | McMillen et al. | 205/50 |
| 2010/0264034 A1 * | 10/2010 | Gebregiorgis | 205/109 |

FOREIGN PATENT DOCUMENTS

| | | |
|---|---|---|
| DE | 102004045844 A1 | 3/2006 |
| EP | 0304834 A2 | 3/1989 |
| EP | 0680988 A2 | 11/1995 |
| GB | 1377887 | 12/1974 |
| JP | 56062830 | 5/1981 |
| JP | 58125760 | 7/1983 |
| JP | 4091170 | 3/1992 |
| JP | 2002069367 | 3/2002 |
| JP | 20022011410 | 7/2002 |
| JP | 2003129005 | 5/2003 |
| JP | 2003226982 | 8/2003 |
| WO | WO 96/00755 | 1/1996 |
| WO | WO 00/47642 | 8/2000 |
| WO | WO 01/42253 | 6/2001 |
| WO | WO 02/051949 A2 | 7/2002 |
| WO | WO2007/117900 A2 | 10/2007 |
| WO | WO 2008/127744 | 10/2008 |

OTHER PUBLICATIONS

International Search Report for Application No. PCT/US2009/048640 mailed Jun. 24, 2010.

International Search Report for Application No. PCT/US2009/068156 mailed Jun. 24, 2010.

Written Opinion for Application No. PCT/US2009/048640 mailed Jun. 24, 2010.

Written Opinion for Application No. PCT/US2009/068156 mailed Jun. 24, 2010.

Kaliyappan, T. et al., "Co-ordination polymers," Progress in Polymer Science, 25 (2000) 343-370.

Kaliyappan, T. et al., "Synthesis and characterization of a new metal chelating polymer and derived Ni (II) and Cu (II) polymer complexes," Polymer, Elsevier Science Publishers, B.V., GB, vol. 37, No. 13, pp. 2865-2869, 1996.

Singh A. et al., "Towards achieving selectivity in metal ion binding by fixing ligand-chelator complex geometry in polymers," Reactive & Functional Polymers, 44 (2000) 79-89.

Tang et al., "The coiled coils in the design of protein-based constructs: hybrid hydrogels and epitope displays," Journal of Controlled Release 72 (2201) 57-50.

Yang, Li Qun et al., "Studies on Coordination-Crosslinking of Soap-Free Polyacrylate Hydrosol and Metal Ion," J. Appl. Polym. Sci., Dec. 26, 1997, John Wiley & Sons Inc., New York, NY vol. 66, No. 13, pp. 2457-2463, XP002474955.

* cited by examiner

METAL CONTAINING INTEGRATED ELECTROCOAT FOR BETTER CORROSION RESISTANCE

FIELD OF THE DISCLOSURE

The invention relates to electrocoat coating compositions, methods of preparing them, methods of electrodeposition of coatings onto a conductive substrate, and electrodeposited coatings.

BACKGROUND OF THE DISCLOSURE

The statements in this section merely provide background information related to this disclosure and may not constitute prior art.

Industrial coating of metal articles that will be used in corrosive environments may include application of one or more inorganic and organic treatments and coatings. Painting systems ("paint shops") in automotive assembly plants are large, complex, and expensive. Metal automotive vehicle bodies (the "body-in-white") and parts, for instance, are given a many-step treatment of cleaning in one or more cleaning baths or spray tanks, application of an aqueous phosphate coating material as a metal pretreatment step in a phosphating bath, then various rinses and additional finishing treatments, such as described in Claffey, U.S. Pat. No. 5,868,820. The phosphating pre-treatment steps are undertaken to improve corrosion resistance of the metal and adhesion of subsequent coatings to the metal. The cleaning and phosphating steps may have 10 or 12 individual treatment stations of spray equipment or dip tanks.

An electrodeposition coating ("electrocoat") is applied after the pretreatment steps to the metal vehicle body. Electrocoat baths usually comprise an aqueous dispersion or emulsion of a principal film-forming epoxy resin ("polymer" and "resin" are used interchangeably in this disclosure), having ionic stabilization in water or a mixture of water and organic cosolvent. In automotive or industrial applications for which durable electrocoat films are desired, the electrocoat compositions are formulated to be curable (thermosetting) compositions. This is usually accomplished by emulsifying with the principal film-forming resin a crosslinking agent that can react with functional groups on the principal resin under appropriate conditions, such as with the application of heat, and so cure the coating. During electrodeposition, coating material containing the ionically-charged resin having a relatively low molecular weight is deposited onto a conductive substrate by submerging the substrate in the electrocoat bath and then applying an electrical potential between the substrate and a pole of opposite charge, for example, a stainless steel electrode. The charged coating material migrates to and deposits on the conductive substrate. The coated substrate is then heated to cure or crosslink the coating.

One of the advantages of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even, continuous coating layer over all portions of the metallic substrate provides maximum anti-corrosion effectiveness. The phosphate pre-treatment, however, has up to now been an indispensable step in protecting against corrosion for automotive vehicle bodies. McMurdie et al., U.S. Pat. No. 6,110,341 teaches that hydrocarbyl phosphate and phosphonic acid esters, which may include polyepoxide linking groups, can be incorporated into electrodeposition baths in amounts of up to 500 ppm on total bath weight for improved corrosion protection. Examples including phenylphosphonic acid were reported to have a modest increase in corrosion protection over untreated steel panels.

A number of patents disclose using certain metal oxides in electrocoat coating compositions or other metal coatings. Among these are Gros et al., U.S. Pat. Appl. Pub. No. 2006/0058423; (manganese oxide); Poulet et al., U.S. Pat. Appl. Pub. No. 2006/0261311 yttrium, zirconium, lanthanum, cerium, praseodymium and neodymium oxides or salts); Maze et al., U.S. Pat. No. 7,081,157 ($MoO_3$); Matsuda et al., JP 2003226982 (bismuth oxide, vanadium pentoxide); Mizoguchi et al., JP2003129005 (zinc oxide); and Kawaraya et al., U.S. Pat. Appl. Pub. No. 2007/0149655 (zirconium oxide).

SUMMARY OF THE DISCLOSURE

We disclose a composition and process for electrodepositing an electrocoat coating on an unphosphated metal substrate (that is, a metal substrate that has not undergone a phosphate pretreatment) in which the electrocoat coating provides excellent corrosion protection. Elimination of the steps and equipment for the phosphating pretreatment process permits a major cost savings in construction of a new paint shop, as well as a simplification and cost savings in operating paint shops now in automotive manufacturing plants.

The process uses an aqueous electrocoat coating composition, also called an electrocoat bath, with a binder comprising a cathodically electrodepositable resin having at least one phosphorous-containing group

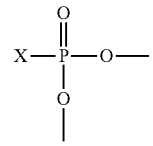

in which X is a hydrogen, a monovalent hydrocarbon group (i.e., hydrocarbyl group), an alkyl group such as an aminoalkyl group, an aryl group, an alkylaryl group, an arylalkyl group, or an oxygen atom having a single covalent bond to the phosphorous atom, and each oxygen atom has a covalent bond to a hydrogen atom, an alkyl group, an aryl group, an alkylaryl group, an arylalkyl group, or the cathodically electrodepositable resin, with the caveat that at least one oxygen atom has a covalent bond to the cathodically electrodepositable resin; the electrocoat coating composition further comprising a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements, and combinations of these. The alkyl groups may be cycloalkyl groups. The alkyl and aryl groups may be hydrocarbyl groups or may include heteroatoms. For convenience, "resin" is used in this disclosure to encompass resin, oligomer, and polymer, and the cathodically electodepositable resin having the phosphorous-containing group will be referred to as an amine-functional phosphorylated resin. "Binder" refers to the film-forming components of the coating composition. Typically the binder is thermosetting or curable.

In one embodiment, the amine-functional phosphorylated resin comprises an amine-functional monophosphate ester or monophosphonic acid ester of a polyepoxide resin. In another embodiment, the amine-functional phosphorylated resin comprises an amine-functional diphosphate ester, triphosphate ester, or diphosphonic acid ester of a polyepoxide resin. In other embodiments, the amine-functional phosphorylated resin includes a combination of these esters. The remaining oxygens on the phosphorous atom that are not covalently bound between the resin and the phosphorous atom may also be esterified. In certain embodiments, at least one P—OH group remains unesterified; that is, the phosphorous containing group has at least one P—OH group.

In various embodiments, the amine-functional phosphorylated resin has one phosphorous atom or a plurality of phosphorous atoms. The amine-functional phosphorylated resin may be prepared using a polyepoxide extended by reaction with one or more extenders, an extender being a material having at least two active hydrogen-containing groups.

In certain embodiments, the amine-functional phosphorylated resin may be from about 0.01 to about 99% by weight of the total binder in the electrodeposition coating composition. Among these embodiments are those in which the amine-functional phosphorylated resin is from about 1 to about 90% by weight of total binder in the electrodeposition coating composition and those in which the amine-functional phosphorylated resin is from about 5 to about 80% by weight of total binder in the electrodeposition coating composition. In certain embodiments, the binder comprises a crosslinker for the amine-functional phosphorylated resin. In certain embodiments, the binder comprises a second amine-functional resin other than the amine-functional phosphorylated resin. In any of these embodiments, the binder may also comprises a crosslinker which reacts during cure of the electrodeposited coating layer with the amine-functional phosphorylated resin, the second amine-functional resin, or both.

In certain embodiments, the electrodeposition coating composition includes from about 0.01 to about 1% by weight of the metal oxide, based on the weight of total binder solids.

We also disclose a method of coating an electrically conductive substrate, such as a metal automotive vehicle body or part, which comprises placing the electrically conductive substrate into the aqueous electrodeposition coating composition comprising a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements, and combinations of these and having a binder comprising an amine-functional phosphorylated resin salted with an acid and, using the electrically conductive substrate as the cathode, passing a current through the aqueous electrodeposition coating composition to deposit a coating layer comprising the metal oxide and the binder onto the electrically conductive substrate. The deposited coating layer may then be cured to a cured coating layer. Subsequent coating layers may be applied on the (optionally cured) electrodeposited coating layer. For example, the electrodeposited coating layer may be a primer layer and other layers such as an optional spray-applied primer surfacer and a topcoat layer or topcoat layers (e.g., a colored basecoat layer and a clearcoat layer) may be applied over the electrodeposited coating layer.

In one embodiment of the method, the electrically conductive substrate is unphosphated before it is coated with an electrodeposited coating comprising the metal oxide and the phosphorylated resin; that is, the substrate is free of a phosphate pre-treatment.

In one embodiment of the method, a metal automotive vehicle body is cleaned, and the cleaned metal automotive vehicle body is electrodeposited with an aqueous coating composition comprising the metal oxide and the amine-functional phosphorylated resin salted with an acid. Thus, no phosphate pretreatment is used. The binder of the electrocoat coating composition may include a second amine-functional resin that does not have phosphorous-containing groups, and generally a crosslinker reactive with one or both amine-functional resins is included in the coating composition so that the electrodeposited coating layer may be cured.

A coated, electrically conductive substrate comprises an electrically deposited coating layer on the substrate, the electrically deposited coating layer comprising a cured coating formed from the metal oxide and a binder comprising an amine-functional phosphorylated resin. In various embodiments, the binder further comprises a crosslinker reactive with the phosphorylated epoxy resin, a second resin such as previously described, or both that reacts during cure to form the cured coating.

By making the phosphorylated resin electrodepositable, a greater amount of the phosphorous-containing groups can be incorporated into the coating composition, resulting in significant improvement in corrosion protection over untreated, particularly unphosphated, metallic substrates such as cold rolled steel. The cured coating provides unexpectedly strong resistance to corrosion. The unexpected resistance to corrosion is thought to be due to interactions between the phosphorous-containing groups of the resin, the metal oxide, and the metallic substrate. While not wishing to be bound by theory, it is believed that the phosphorous-containing groups of the resin interact with both the metal substrate and the metal oxide to enhance the anticorrosive effectiveness of the metal oxide.

"A," "an," "the," "at least one," and "one or more" are used interchangeably to indicate that at least one of the item is present; a plurality of such items may be present. Other than in the working examples provides at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

A metal substrate, which may be unphosphated, is electrocoated with an aqueous electrocoat coating composition comprising a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements, and combinations of these and having a binder comprising an amine-functional phosphorylated resin. The amine-functional phosphorylated resin is salted with an acid. The electrodeposited coating layer may be cured and may be overcoated with one or more additional coating layers. The amine-functional phosphorylated resin has at least one covalently bonded, phosphorous-containing group having a structure

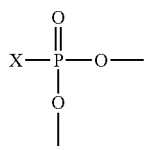

in which X is a hydrogen, a monovalent hydrocarbon group, an alkyl group such as an aminoalkyl group, an aryl group, an alkylaryl group, an arylalkyl group, or an oxygen atom singly bonded to the phosphorous atom, and each oxygen atom has a covalent bond to a hydrogen atom, an alkyl group, an aryl group, an alkylaryl group, an arylalkyl group, or the cathodically electrodepositable resin, with the caveat that at least one oxygen atom has a covalent bond to the cathodically electrodepositable resin. In each case, an alkyl group may be a cycloalkyl group.

The amine-functional phosphorylated resin may be prepared using any resin or polymerizable monomer that may be esterified with the phosphorous-containing group. Electrocoat coating binders often include epoxy resins, and the amine-functional phosphorylated resin may, for example, be an epoxy resin.

An amine-functional phosphorylated epoxy resin may be prepared in various ways. In a first way, an amine-functional phosphorylated epoxy resin may be prepared by reaction of an epoxide-functional or hydroxyl-functional epoxy resin with a —P(OR)$_2$=O group-containing acid or acid derivative, with at least one R being a hydrogen atom or a low alkyl group (by which we mean an alkyl group having one to four carbon atoms), particularly methyl, ethyl, propyl, isopropyl, isobutyl, butyl, or tert-butyl, that can be transesterified, such as phosphoric acid, a mono- or diester of phosphoric acid, hypophosphoric acid, a monoester of hypophosphoric acid, alkyl- or arylphosphonic acid, a monoester of alkyl- or arylphosphonic acid, and combinations of these. The epoxide-functional resin has at least one epoxide or hydroxyl group for reaction with the phosphorous-containing acid or acid derivative and has either an amine group or a further group (which may also be an epoxide group) for reaction with a compound containing an amine group.

Suitable, nonlimiting examples of polyepoxide resins that may be reacted with the —P(OR)$_2$=O group-containing acid include epoxy resins with a plurality of epoxide groups, such as diglycidyl aromatic compounds such as the diglycidyl ethers of polyhydric phenols such as 2,2-bis(4-hydroxyphenyl)propane(bisphenol A), 2,2-bis(4-hydroxy-3-methylphenyl)propane, 4,4'-dihydroxybenzophenone, dihydroxyacetophenones, 1,1-bis(4hydroxyphenylene)ethane, bis(4-hydroxyphenyl)methane, 1,1-bis(4hydroxyphenyl) isobutane, 2,2-bis(4-hydroxy-tert-butylphenyl)propane, 1,4-bis(2-hydroxyethyl)piperazine, 2-methyl-1,1-bis(4-hydroxyphenyl)propane, bis-(2-hydroxynaphthyl)methane, 1,5-dihydroxy-3-naphthalene, and other dihydroxynaphthylenes, catechol, resorcinol, and the like, including diglycidyl ethers of bisphenol A and bisphenol A-based resins having a structure

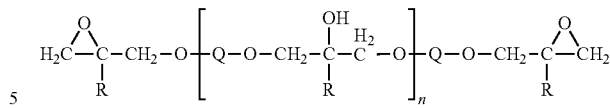

wherein Q is

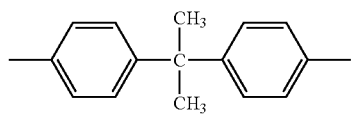

R is H, methyl, or ethyl, and n is an integer from 0 to 10. In certain embodiments, n is an integer from 1 to 5. Also suitable are the diglycidyl ethers of aliphatic diols, including the diglycidyl ethers of 1,4-butanediol, cyclohexanedimethanols, ethylene glycol, propylene glycol, diethylene glycol, dipropylene glycol, triethylene glycol, tripropylene glycol, polypropylene glycol, polyethylene glycol, poly(tetrahydrofuran), 1,3-propanediol, 2,2,4-trimethyl-1,3-pentanediol, 1,6-hexanediol, 2,2-bis(4-hydroxycyclohexyl)propane, and the like. Diglycidyl esters of dicarboxylic acids can also be used as polyepoxides. Specific examples of compounds include the diglycidyl esters of oxalic acid, cyclohexanediacetic acids, cyclohexanedicarboxylic acids, succinic acid, glutaric acid, phthalic acid, terephthalic acid, isophthalic acid, naphthalene dicarboxylic acids, and the like. A polyglycidyl reactant may be used, preferably in a minor amount in combination with diepoxide reactant. Novolac epoxies may be used as a polyepoxide-functional reactant. The novolac epoxy resin may be selected from epoxy phenol novolac resins or epoxy cresol novolac resins. Other suitable higher-functionality polyepoxides are glycidyl ethers and esters of triols and higher polyols such as the triglycidyl ethers of trimethylolpropane, trimethylolethane, 2,6-bis(hydroxymethyl)-p-cresol, and glycerol; tricarboxylic acids or polycarboxylic acids. Also useful as polyepoxides are epoxidized alkenes such as cyclohexene oxides and epoxidized fatty acids and fatty acid derivatives such as epoxidized soybean oil. Other useful polyepoxides include, without limitation, polyepoxide polymers such as acrylic, polyester, polyether, and epoxy resins and polymers, and epoxy-modified polybutadiene, polyisoprene, acrylobutadiene nitrile copolymer, or other epoxy-modified rubber-based polymers that have a plurality of epoxide groups.

The polyepoxide resin may be reacted with an extender to prepare a polyepoxide resin having a higher molecular weight having beta-hydroxy ester linkages. Suitable, nonlimiting examples of extenders include polycarboxylic acids, polyols, polyphenols, and amines having two or more amino hydrogens, especially dicarboxylic acids, diols, diphenols, and diamines. Particular, nonlimiting examples of suitable extenders include diphenols, diols, and diacids such as those mentioned above in connection with forming the polyepoxide; polycaprolactone diols, and ethoxylated bisphenol A resins such as those available from BASF Corporation under the trademark MACOL®. Other suitable extenders include, without limitation, carboxy- or amine-functional acrylic, polyester, polyether, and epoxy resins and polymers. Still other suitable extenders include, without limitation, polyamines, including diamines such as ethylenediamine, diethylenetriamine, triethylenetetramine, dimethylaminopropylamine, dimethylaminobutylamine, diethylaminopropylamine, diethylaminobutylamine, dipropylamine, and piperizines such as 1-(2-aminoethyl)piperazine, polyalkylenepolyamines such as triethylenetetramine, tetraethylenepentamine, pentaethylenehexamine, tripropylenetetramine, tetrapropylenepentamine, pentapropylenehexamine, N,N'-bis(3-aminopropyl)ethylenediamine, N-(2-hydroxyethyl)propane-1,3-diamine, and polyoxyalkylene amines such as those available from BASF AG under the trademark POLYAMIN® or from Huntsman under the trademark JEFFAMINE®.

A monofunctional reactant may optionally be reacted with the polyepoxide resin and the extender or after reaction of the polyepoxide with the extender to prepare an epoxide-functional resin. Suitable, nonlimiting examples of monofunctional reactants include phenol, alkylphenols such as nonylphenol and dodecylphenol, other monofunctional, epoxide-reactive compounds such as dimethylethanolamine and monoepoxides such as the glycidyl ether of phenol, the glycidyl ether of nonylphenol, or the glycidyl ether of cresol, and dimer fatty acid.

Useful catalysts for the reaction of the polyepoxide resin with the extender and optional monofunctional reactant include any that activate an oxirane ring, such as tertiary amines or quaternary ammonium salts (e.g., benzyldimethylamine, dimethylaminocyclohexane, triethylamine, N-methylimidazole, tetramethyl ammonium bromide, and tetrabutyl ammonium hydroxide.), tin and/or phosphorous complex salts (e.g., $(CH_3)_3SNI$, $(CH_3)_4PI$, triphenylphosphine, ethyltriphenyl phosphonium iodide, tetrabutyl phosphonium iodide) and so on. It is known in the art that tertiary amine catalysts may be preferred with some reactants. The reaction may be carried out at a temperature of from about 100° C. to about 350° C. (in other embodiments 160° C. to 250° C.) in solvent or neat. Suitable solvents include, without limitation, inert organic solvent such as a ketone, including methyl isobutyl ketone and methyl amyl ketone, aromatic solvents such as toluene, xylene, Aromatic 100, and Aromatic 150, and esters, such as butyl acetate, n-propyl acetate, hexyl acetate.

The polyepoxide resin may be reacted with the phosphorous-containing acid or acid derivative before, during, or after reaction of the polyepoxide resin with the extender and optional monofunctional reactant. The reaction with the acid or acid derivative, if carried out before or after the reaction with the extender, may be carried out at a temperature of from about 50° C. to about 150° C. in solvent, including any of those already mentioned, or neat. The polyepoxide resin may also be reacted with the phosphorous-containing acid or acid derivative and optionally a monofunctional reactant such as those already described and not be reacted with an extender.

The amine-functional phosphorylated resin has at least one amine group, and this amine functionality may introduced before or after the phosphorylating reaction. If before, the amine functionality may be introduced by reaction of the polyepoxide resin with an extender having a tertiary amine group or with a monofunctional reactant having a tertiary amine group. Suitable, nonlimiting examples of extenders and monofunctional reactants having an amine group include diethanolamine, dipropanolamine, diisopropanolamine, dibutanolamine, diisobutanolamine, diglycolamine, methylethanolamine, dimethylaminopropylamine, and compounds having a primary amine group that has been protected by forming a ketimine, such as the ketimine of diethylenetriamine.

The polyepoxide resin, extended polyepoxide resin, or epoxide-functional resin is then reacted with the phosphorous-containing acid or acid derivative to make a phosphorylated resin. In certain particular embodiments, the polyepoxide resin, extended polyepoxide resin, or epoxide-functional resin is reacted with phosphoric acid or a source of phosphoric acid to make a phosphorylated resin. The phosphoric acid or source of phosphoric acid used in the reaction may be nonaqueous phosphoric acid, 85% in water, a more dilute aqueous phosphoric acid, pyrophosphoric acid, or polyphosphoric acid. Other suitable phosphoric acid sources are described in Campbell et al., U.S. Pat. No. 4,397,970, incorporated herein by reference. In other embodiments, the polyepoxide resin, extended polyepoxide resin, or epoxide-functional resin is reacted with another phosphorous-containing acid or acid derivative such as one of those mentioned above.

The phosphorylated resin may include monophosphonic acid esters, diphosphonic acid esters, monophosphate ester, diphosphate esters, and triphosphate esters, as well as combinations of these. In addition, the phosphorylated resin may have one or a plurality of the phosphorous-containing ester groups. The extent of esterification of phosphorous-containing acid or acid derivative and the number of phosphorous-containing ester groups incorporated into the resin is controlled, inter alia, by the relative equivalents of the reactants. In one example, from about 1 to about 3 equivalents of resin (based on epoxide and hydroxyl groups) is reacted with each equivalent of phosphoric acid or phosphoric acid derivative. In another example, from about 1 to about 2 equivalents of resin (based on epoxide and hydroxyl groups) is reacted with each equivalent of phosphonic acid or phosphonic acid derivative. The equivalents of the resin reactive groups may also be in excess of the equivalents of acid or acid derivative. The resin and phosphoric or phosphonic acid or acid derivative may be mixed together and allowed to react until a desired extent of reaction is obtained. In certain embodiments, the weight per epoxide after reaction of an epoxide-functional resin is from about 180 to about 1200.

Other reactants that may be used in addition to the resin and phosphorous-containing acid or acid derivative may include alcohols such as n-butanol, isopropanol, and n-propanol; glycol ethers such as ethylene glycol monobutyl ether, propylene glycol monobutyl ether, and propylene glycol monopropyl ether; amines such as any of those mentioned above; water; and combinations of these. These reactants can also be used to react with excess oxirane groups after the reaction of the resin with the acid or acid derivative.

The amine functionality may be imparted to the phosphorylated resin in one of two ways. In a first way, an amine having at least one active hydrogen reactive with an epoxide group is included as a reactant in the reaction of the epoxide-functional resin and phosphoric acid or source of phosphoric acid. In a second way, the reaction product of the epoxide-functional epoxy resin and phosphoric acid (and any further reactants) is an epoxide-functional product that is then further reacted with an amine having at least one active hydrogen reactive with an epoxide group. Examples of suitable amine compounds include, without limitation, dimethylaminopropylamine, N,N-diethylaminopropylamine, dimethylaminoethylamine, N-aminoethylpiperazine, aminopropylmorpholine, tetramethyldipropylenetriamine, methylamine, ethylamine, dimethylamine, dibutylamine, ethylenediamine, diethylenetriamine, triethylenetetramine, dimethylaminobutylamine, diethylaminopropylamine, diethylaminobutylamine, dipropylamine, methylbutylamine, alkanolamines such as methylethanolamine, aminoethylethanolamine, aminopropylmonomethylethanolamine, and diethanolamine, diketimine (a reaction product of 1 mole diethylenetriamine and 2 moles methyl isobutyl ketone), and polyoxyalkylene amines.

In certain embodiments, the phosphorylated resin is an epoxide-functional resin that is reacted with an extender, such any of those already mentioned.

The amine-functional phosphorylated resin is used to prepare an electrocoat coating composition (also known as an electrocoat bath). In general, a binder is prepared comprising the amine-functional phosphorylated resin, then the binder is dispersed in an aqueous medium by salting amine groups present in the binder with an acid.

In certain embodiments, the amine-functional phosphorylated resin comprises from about 0.01 to about 99% by weight of binder in the electrodeposition coating composition. The amine-functional phosphorylated resin may comprise from about 0.01 to about 99% by weight of binder, 1 to about 90% by weight of binder, or from about 5 to about 80% by weight of binder in the electrodeposition coating composition.

The binder may also comprise a crosslinker that reacts with the amine-functional phosphorylated resin during curing of a coating layer formed on a substrate. Suitable examples of crosslinking agents, include, without limitation, polyisocyanates (particularly blocked polyisocyanates) and aminoplasts. Examples of aromatic, aliphatic or cycloaliphatic polyisocyanates include diphenylmethane-4,4'-diisocyanate (MDI), 2,4- or 2,6-toluene diisocyanate (TDI), p-phenylene diisocyanate, tetramethylene diisocyanate, hexamethylene diisocyanate, dicyclohexylmethane-4,4'-diisocyanate, isophorone diisocyanate, mixtures of phenylmethane-4,4'-diisocyanate, polymethylene polyphenylisocyanate, 2-isocyanatopropylcyclohexyl isocyanate, dicyclohexylmethane 2,4'-diisocyanate, 1,3-bis(iso-cyanatomethyl)cyclohexane, diisocyanates derived from dimer fatty acids, as sold under the commercial designation DDI 1410 by Henkel, 1,8-diisocyanato-4-isocyanatomethyloctane, 1,7-diisocyanato-4-isocyanato-methylheptane or 1-isocyanato-2-(3-isocyanatopropyl)-cyclohexane, and higher polyisocyanates such as triphenylmethane-4,4',4"-triisocyanate, or mixtures of these polyisocyanates. Suitable polyisocyantes also include polyisocyanates derived from these that containing isocyanurate, biuret, allophanate, iminooxadiazinedione, urethane, urea, or uretdione groups. Polyisocyanates containing urethane groups, for example, are obtained by reacting some of the isocyanate groups with polyols, such as trimethylolpropane, neopentyl glycol, and glycerol, for example. The isocyanate groups are reacted with a blocking agent. Examples of suitable blocking agents include phenol, cresol, xylenol, epsilon-caprolactam, delta-valerolactam, gamma-butyrolactam, diethyl malonate, dimethyl malonate, ethyl acetoacetate, methyl acetoacetate, alcohols such as methanol, ethanol, isopropanol, propanol, isobutanol, tert-butanol, butanol, glycol monoethers such as ethylene or propylene glycol monoethers, acid amides (e.g. acetoanilide), imides (e.g. succinimide), amines (e.g. diphenylamine), imidazole, urea, ethylene urea, 2-oxazolidone, ethylene imine, oximes (e.g. methylethyl ketoxime), and the like.

The binder may include one or more additional resins. Nonlimiting examples of suitable additional resins include epoxy resins, polyesters, polyurethanes, vinyl resins such as polyacrylate resins, and polybutadiene resins. The additional resin may be, for example, any of the polyepoxide resins, extended polyepoxide resins, or epoxide-functional resins already mentioned, optionally reacted with a compound having at least one epoxide-reactive group.

As understood by those skilled in the art, an aminoplast resin is formed by the reaction product of formaldehyde and amine where the preferred amine is a urea or a melamine. Although urea and melamine are the preferred amines, other amines such as triazines, triazoles, diazines, guanidines, or guanamines may also be used to prepare the aminoplast resins. Furthermore, although formaldehyde is preferred for forming the aminoplast resin, other aldehydes, such as acetaldehyde, crotonaldehyde, and benzaldehyde, may also be used. Nonlimiting examples of suitable aminoplast resins include monomeric or polymeric melamine-formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like.

In certain embodiments the binder comprises another amine-functional resin. Nonlimiting examples of suitable amine-functional resins include amine-functional epoxy resins, polyesters, polyurethanes, vinyl resins such as polyacrylate resins, and polybutadiene resins. Amine-functional epoxy resins may be prepared by reacting any of the polyepoxide resins, extended polyepoxide resins, or epoxide-functional resins already mentioned with an amine, including any of those mentioned above as suitable for preparing the amine-functional phosphorylated resin.

Cationic polyurethanes and polyesters may also be used. Such materials may be prepared by endcapping with, for example, an aminoalcohol or, in the case of the polyurethane, the same compound comprising a saltable amine group previously described may also be useful.

Polybutadiene, polyisoprene, or other epoxy-modified rubber-based polymers can be used as the resin in the present invention. The epoxy-rubber can be capped with a compound comprising a saltable amine group.

Cationic acrylic resins may be made cathodic by incorporation of amino-containing monomers, such as acrylamide, methacrylamide, N,N'-dimethylaminoethyl methacrylate tert-butylaminoethyl methacrylate. 2-vinylpyridine, 4-vinylpyridine, vinylpyrrolidine or other such amino monomers. Alternatively, epoxy groups may be incorporated by including an epoxy-functional monomer in the polymerization reaction. Such epoxy-functional acrylic polymers may be made cathodic by reaction of the epoxy groups with amines according to the methods previously described for the epoxy resins. The polymerization may also include a hydroxyl-functional monomer. Useful hydroxyl-functional ethylenically unsaturated monomers include, without limitation, hydroxyethyl methacrylate, hydroxyethyl acrylate, hydroxypropyl acrylate, hydroxypropyl methacrylate, hydroxybutyl acrylate, hydroxybutyl methacrylate, the reaction product of methacrylic acid with styrene oxide, and so on. Preferred hydroxyl monomers are methacrylic or acrylic acid esters in which the hydroxyl-bearing alcohol portion of the compound is a linear or branched hydroxy alkyl moiety having from 1 to about 8 carbon atoms.

The monomer bearing the hydroxyl group and the monomer bearing the group for salting (amine for a cationic group or acid or anhydride for anionic group) may be polymerized with one or more other ethylenically unsaturated monomers. Such monomers for copolymerization are known in the art. Illustrative examples include, without limitation, alkyl esters of acrylic or methacrylic acid, e.g., methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, t-butyl acrylate, t-butyl methacrylate, amyl acrylate, amyl methacrylate, isoamyl acrylate, isoamyl methacrylate, hexyl acrylate, hexyl methacrylate, 2-ethylhexyl acrylate, decyl acrylate, decyl methacrylate, isodecyl acrylate, isodecyl methacrylate, dodecyl acrylate, dodecyl methacrylate, cyclohexyl acrylate, cyclohexyl methacrylate, substituted cyclohexyl acrylates and methacrylates, 3,5,5-trimethylhexyl acrylate, 3,5,5-trimethylhexyl methacrylate, the corresponding esters of maleic, fumaric, crotonic, isocrotonic, vinylacetic, and itaconic acids, and the like; and vinyl monomers such as styrene, t-butyl styrene, alpha-methyl styrene, vinyl toluene and the like. Other useful polymerizable co-monomers include, for example, alkoxyethyl acrylates and methacrylates, acryloxy acrylates and methacrylates, and compounds such as acrylonitrile, methacrylonitrile, acrolein, and methacrolein. Combinations of these are usually employed.

The binder may also comprise a crosslinker that reacts with the amine-functional resin other than the phosphorylated resin during curing of a coating layer formed on a substrate, or the binder may also comprise a crosslinker that reacts with both the amine-functional resin other than the phosphorylated resin and the phosphorylated resin during curing of a coating layer formed on a substrate. Optionally, plasticizer or solvents or both can be added to the binder mixture. Nonlimiting examples of coalescing solvents include alcohols, glycol ethers, polyols, and ketones. Specific coalescing solvents include monobutyl and monohexyl ethers of ethylene glycol, phenyl ether of propylene glycol, monoalkyl ethers of ethylene glycol such as the monomethyl, monoethyl, monopropyl, and monobutyl ethers of ethylene glycol or propylene glycol; dialkyl ethers of ethylene glycol or propylene glycol such as ethylene glycol dimethyl ether and propylene glycol dimethyl ether; butyl carbitol; diacetone alcohol. Nonlimiting examples of plasticizers include ethylene or propylene oxide adducts of nonyl phenols, bisphenol A, cresol, or other such materials, or polyglycols based on ethylene oxide and/or propylene oxide. The amount of coalescing solvent is not critical and is generally between about 0 to 15 percent by weight, preferably about 0.5 to 5 percent by weight based on total weight of the resin solids. Plasticizers can be used at levels of up to 15 percent by weight resin solids.

The binder is emulsified in water in the presence of an acid. Nonlimiting examples of suitable acids include phosphoric acid, phosphonic acid, propionic acid, formic acid, acetic acid, lactic acid, or citric acid. The salting acid may be blended with the binder, mixed with the water, or both, before the binder is added to the water. The acid is used in an amount sufficient to neutralize enough of the amine groups to impart water-dispersibility to the binder. The amine groups may be fully neutralized; however, partial neutralization is usually sufficient to impart the required water-dispersibility. By saying that the resin is at least partially neutralized, we mean that at least one of the saltable groups of the binder is neutralized, and up to all of such groups may be neutralized. The degree of neutralization that is required to afford the requisite water-dispersibility for a particular binder will depend upon its composition, molecular weight of the resins, weight percent of amine-functional resin, and other such factors and can readily be determined by one of ordinary skill in the art through straightforward experimentation.

The binder emulsion is then used in preparing an electrocoat coating composition (or bath). The electrocoat bath includes a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, and oxides of the lanthanide series of elements and may include one or more other pigments, The metal oxide and optional additional pigments and/or fillers may be predispersed in a resin before or after the resin is salted and water is added, or the metal oxide and any optional additional pigment may be separately added as part of a pigment paste. The bath may contain any further desired materials such as coalescing aids, antifoaming aids, and other additives that may be added before or after emulsifying the resin.

The metal oxide is selected from the group consisting of bismuth oxide, vanadium oxide, manganese oxide, cobalt oxide, zinc oxide, strontium oxide, yttrium oxide, molybdenum oxide, zirconium oxide, lanthanum oxide, and oxides of the lanthanide series of elements. The metal oxide may of any available oxidation state of these metals. In various embodiments, the metal oxide comprises $Bi_2O_3$, $ZnO$, $Co_3O_4$, $CoO$, $Co_2O_3$, $MnO_2$, $MnO$, $Mn_3O_4$, $Mn_2O_3$, $Mn_2O_7$, $MoO_2$, $SrO$, $V_2O_5$, $VO$, $VO_2$, $Y_2O_3$, $ZrO_2$, $La_2O_3$, $Ce_2O_3$, $Pr_6O_{11}$, $Nd_2O_3$, $Pm_2O_3$, $Sm_2O_3$, $Eu_2O_3$, $Gd_2O_3$, $Tb_2O_3$, $Tb_4O_7$, $Dy_2O_3$, $Ho_2O_3$, $Er_2O_3$, $Tm_2O_3$, $Yb_2O_3$, $Lu_2O_3$, and combinations of these. In various embodiments, the metal oxide may be included in amounts of from about 0.01 to about 1 percent by weight, based on total binder solids weight.

Conventional pigments for electrocoat primers may also be incorporated into the electrocoat coating composition; nonlimiting examples of such pigments include titanium dioxide, ferric oxide, carbon black, aluminum silicate, precipitated barium sulfate, aluminum phosphomolybdate, strontium chromate, basic lead silicate and lead chromate. The metal oxide and any optional pigments may be dispersed using any suitable resin, such as a grind resin or a pigment dispersant, as is known in the art. The pigment-to-resin weight ratio in the electrocoat bath can be important and should be preferably less than 50:100, more preferably less than 40:100, and usually about 10 to 30:100. Higher pigment-to-resin solids weight ratios have been found to adversely affect coalescence and flow. Usually, the total amount of pigment is 10-40 percent by weight of the nonvolatile material in the bath. In some embodiments, the total amount of pigment is 15 to 30 percent by weight of the nonvolatile material in the bath. Any of the pigments and fillers generally used in electrocoat primers may be included. Inorganic extenders such as clay and anti-corrosion pigments are commonly included in addition to the metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements, and combinations of these.

The electrodeposition coating compositions can contain optional ingredients such as dyes, flow control agents, plasticizers, catalysts, wetting agents, surfactants, UV absorbers, HALS compounds, antioxidants, defoamers and so forth. Examples of surfactants and wetting agents include alkyl imidazolines such as those available from Ciba-Geigy Industrial Chemicals as AMINE C® acetylenic alcohols such as those available from Air Products and Chemicals under the tradename SURFYNOL®. Surfactants and wetting agents, when present, typically amount to up to 2 percent by weight resin solids.

Curing catalysts such as tin catalysts can be used in the coating composition. Typical examples are without limitation, tin and bismuth compounds including dibutyltin dilaurate, dibutyltin oxide, and bismuth octoate. When used, catalysts are typically present in amounts of about 0.05 to 2 percent by weight tin based on weight of total resin solids.

The electrocoat coating composition is electrodeposited onto a metallic substrate. The substrate may be, as some nonlimiting examples, cold-rolled steel, galvanized (zinc coated) steel, electrogalvanized steel, stainless steel, pickled steel, GALVANNEAL® GALVALUME®, and GALVAN® zinc-aluminum alloys coated upon steel, and combinations of these. Nonlimiting examples of useful non-ferrous metals include aluminum, zinc, magnesium and alloys of these. The electrodeposition of the coating preparations according to the invention may be carried out by known processes. The electrodeposition coating composition may be applied preferably to a dry film thickness of 10 to 35 μm. In one embodiment of the method, the electrically conductive substrate is unphosphated; that is, it is free of a phosphate pre-treatment The article coated with the composition of the invention may be a metallic automotive part or body. A method of coating an electrically conductive substrate, such as a metal automotive vehicle body or part, comprises placing an electrically conductive substrate, cleaned but preferably not given a phosphate pre-treatment, into the electrocoat coating composition and, using the electrically conductive substrate as the cathode, passing a current through the electrocoat coating composition causing a coating layer to deposit onto the electrically conductive substrate. After application, the coated article is removed from the bath and rinsed with deionized water. The coating may be cured under appropriate conditions, for example by baking at from about 275° F. to about 375° F. for between about 15 and about 60 minutes, before applying an additional coating layer over the electrodeposited coating layer.

An automotive vehicle body may be electrocoated. The automotive vehicle body is cleaned, and the cleaned metal automotive vehicle body is electrocoated with an aqueous electrodeposition coating composition comprising the metal oxide and the phosphorylated resin.

One or more additional coating layers, such as a spray-applied primer-surfacer, single topcoat layer, or composite color coat (basecoat) and clearcoat layer, may be applied over the electrocoat layer. A single layer topcoat is also referred to as a topcoat enamel. In the automotive industry, the topcoat is typically a basecoat that is overcoated with a clearcoat layer. A primer surfacer and the topcoat enamel or basecoat and clearcoat composite topcoat may be waterborne, solventborne, or a powder coating, which may be a dry powder or an aqueous powder slurry.

The composite coating of the invention may have, as one layer, a primer coating layer, which may also be termed a primer-surfacer or filler coating layer. The primer coating layer can be formed from a solventborne composition, waterborne composition, or powder composition, including powder slurry composition. The primer composition preferably has a binder that is thermosetting, although thermoplastic binders are also known. Suitable thermosetting binders may have self-crosslinking polymers or resins, or may include a crosslinker reactive with a polymer or resin in the binder. Nonlimiting examples of suitable binder polymers or resins include acrylics, polyesters, and polyurethanes. Such polymers or resins may include as functional groups hydroxyl groups, carboxyl groups, anhydride groups, epoxide groups, carbamate groups, amine groups, and so on. Among suitable crosslinkers reactive with such groups are aminoplast resins (which are reactive with hydroxyl, carboxyl, carbamate, and amine groups), polyisocyanates, including blocked polyisocyanates (which are reactive with hydroxyl group and amine groups), polyepoxides (which are reactive with carboxyl, anhydride, hydroxyl, and amine groups), and polyacids and polyamines (which are reactive with epoxide groups). Examples of suitable primer compositions are disclosed, for example, in U.S. Pat. Nos. 7,338,989; 7,297,742; 6,916,877; 6,887,526; 6,727,316; 6,437,036; 6,413,642; 6,210,758; 6,099,899; 5,888,655; 5,866,259; 5,552,487; 5,536,785; 4,882,003; and 4,190,569, each assigned to BASF and each incorporated herein by reference.

The primer coating composition applied over the electrocoat primer may then be cured to form a primer coating layer. The electrocoat primer may be cured at the same time as the primer coating layer in a process known as "wet-on-wet" coating.

A topcoat composition may be applied over the electrocoat layer or primer coating layer and, preferably, cured to form a topcoat layer. In a preferred embodiment, the electrocoat layer or primer layer is coated with a topcoat applied as a color-plus-clear (basecoat-clearcoat) topcoat. In a basecoat-clearcoat topcoat, an underlayer of a pigmented coating, the basecoat, is covered with an outer layer of a transparent coating, the clearcoat. Basecoat-clearcoat topcoats provide an attractive smooth and glossy finish and generally improved performance.

Crosslinking compositions are preferred as the topcoat layer or layers. Coatings of this type are well-known in the art and include waterborne compositions, solventborne compositions, and powder and powder slurry compositions. Polymers known in the art to be useful in basecoat and clearcoat compositions include, without limitation, acrylics, vinyls, polyurethanes, polycarbonates, polyesters, alkyds, and polysiloxanes. Acrylics and polyurethanes are among preferred polymers for topcoat binders. Thermoset basecoat and clearcoat compositions are also preferred, and, to that end, preferred polymers comprise one or more kinds of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin. Examples of suitable topcoat compositions are disclosed, for example, in U.S. Pat. Nos. 7,375,174; 7,342,071; 7,297,749; 7,261,926; 7,226,971; 7,160,973; 7,151,133; 7,060,357; 7,045,588; 7,041,729; 6,995,208; 6,927,271; 6,914,096; 6,900,270; 6,818,303; 6,812,300; 6,780,909; 6,737,468; 6,652,919; 6,583,212; 6,462,144; 6,337,139; 6,165,618; 6,129,989; 6,001,424; 5,981,080; 5,855,964; 5,629,374; 5,601,879; 5,508,349; 5,502,101; 5,494,970; 5,281,443; and, each assigned to BASF and each incorporated herein by reference.

The further coating layers can be applied to the electrocoat coating layer according to any of a number of techniques well-known in the art. These include, for example, spray coating, dip coating, roll coating, curtain coating, and the like. For automotive applications, the further coating layer or layers are preferably applied by spray coating, particularly electrostatic spray methods. Coating layers of one mil or more are usually applied in two or more coats (passes), separated by a time sufficient to allow some of the solvent or aqueous medium to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

A primer layer may be cured before the topcoat is applied. The cured primer layer may be from about 0.5 mil to about 2 mils thick, preferably from about 0.8 mils to about 1.2 mils thick.

Color-plus-clear topcoats are usually applied wet-on-wet. The compositions are applied in coats separated by a flash, as described above, with a flash also between the last coat of the color composition and the first coat of the clear. The two coating layers are then cured simultaneously. Preferably, the cured basecoat layer is 0.5 to 1.5 mils thick, and the cured clear coat layer is 1 to 3 mils, more preferably 1.6 to 2.2 mils, thick.

Alternatively the primer layer and the topcoat can be applied "wet-on-wet." For example, the primer composition can be applied, then the applied layer flashed; then the topcoat can be applied and flashed; then the primer and the topcoat can be cured at the same time. Again, the topcoat can include a basecoat layer and a clearcoat layer applied wet-on-wet. The primer layer can also be applied to an uncured electrocoat coating layer, and all layers cured together.

The coating compositions described are preferably cured with heat. Curing temperatures are preferably from about 70° C. to about 180° C., and particularly preferably from about 170° F. to about 200° F. for a topcoat or primer composition including an unblocked acid catalyst, or from about 240° F. to about 275° F. for a topcoat or primer composition including a blocked acid catalyst. Typical curing times at these temperatures range from 15 to 60 minutes, and preferably the temperature is chosen to allow a cure time of from about 15 to about 30 minutes. In a preferred embodiment, the coated article is an automotive body or part.

The invention is further described in the following example. The example is merely illustrative and does not in any way limit the scope of the invention as described and claimed. All parts are parts by weight unless otherwise noted.

EXAMPLES

Preparation A

Preparation of Amine-Functional Phosphorylated Epoxy Resin

A reactor equipped with an agitator and reflux condenser is charged with 25.85 parts by weight of normal butanol, 10.20 parts by weight of ethylene glycol monobutyl ether, and 55.62 parts by weight of the diglycidyl ether of bisphenol A. The reactor contents are stirred for about 15 minutes followed by addition of 3.11 parts by weight of diethanolamine. The resulting mixture is heated to 77° F. (25° C.); heat is then discontinued, and the reaction mixture is allowed to exotherm. The temperature of the reaction continues to increase to 120.2-122° F. (49-50° C.). The reaction mixture is maintained at 140-149° F. (60-65° C.) for 30 minutes. To the reactor is added a mixture of 4.261 parts by weight phosphoric acid (75% aqueous) and 1.77 parts by weight normal butanol. During the addition the temperature is held to below 102.2° F. (49° C.). The reaction mixture is stirred for about 15 minutes, then the reactor is heated to 220-250° F. (104.4-121.1° C.). Reaction is continued until the weight per epoxide of the product is 800 or greater. Then, deionized water is added in a first portion of 0.899 parts by weight, and the reaction mixture is maintained at 220-250° F. (104.4-121.1° C.) for one hour. A second portion of deionized water, 0.70 parts by weight, is then added to the reaction mixture. Again the reaction mixture is maintained at 220-250° F. (104.4-121.1° C.) for one hour. A final portion of deionized water, 0.70 parts by weight, is then added to the reaction mixture. Again the reaction mixture is maintained at 220-250° F. (104.4-121.1° C.) for one hour. The product is then diluted with normal butanol to 72% nonvolatile by weight.

Preparation B

Preparation of Binder Emulsion with Amine-Functional Phosphorylated Epoxy Resin

The following materials are combined in a 5-L flask with an associated heating mantle: diglycidyl ether of bisphenol A (18.03 parts by weight), bisphenol A (4.1 parts by weight), phenol (1.41 parts by weight), and propylene glycol n-butyl ether (0.36 parts by weight).

While stirring, the temperature is raised to 257° F. (125° C.). Subsequently, triphenylphosphine (0.04 parts by weight) is added and the exotherm is recorded as 392° F. (200° C.). The mixture is then allowed to cool to 275° F. (135° C.), and a weight per epoxide (WPE) determination (target=525+/−25) is conducted and is 526. After cooling to 194° F. (90° C.) and turning off the heating mantle, 2.36 parts by weight of PLURACOL® 710R (sold by BASF Corporation) is added, then 1.73 parts by weight of diethanolamine is introduced and the exotherm is recorded as 239° F. (115° C.). The reaction mixture is allowed to stir for an additional 30 minutes at 221° F. (105° C.) after reaching exotherm. After stirring for 30 minutes, 3-dimethylaminopropylamine is added at 221° F. (105° C.) (0.84 parts by weight), and the exotherm is recorded as 280.4° F. (138° C.). The mixture is stirred for an additional hour. A crosslinker (a blocked isocyanate based on polymeric MDI and monofunctional alcohols) (13.6 parts by weight) is added. The mixture is stirred for 30 minutes at 221-230° F. (105-110° C.). Preparation A, the amine-functional phosphorylated epoxy resin, (6.47 parts by weight) is added and the mixture is stirred for an additional 15 minutes at 221-230° F. (105-110° C.).

After achieving a homogeneous mixture, the resins and crosslinker blend is added to an acid/water mixture, under constant stirring, of deionized water (34.95 parts by weight) and formic acid (88%) (0.62 parts by weight). After thoroughly mixing all components using a metal spatula, the solids are further reduced by addition of water (18.55 parts by weight). A flow-additive package (2.51 parts by weight) is added to the mixture.

Preparation C

Grinding Resin Solution

In accordance with EP 0 505 445 B1, an aqueous-organic grinding resin solution is prepared by reacting, in the first stage, 2598 parts of bisphenol A diglycidyl ether (epoxy equivalent weight (EEW) 188 g/eq), 787 parts of bisphenol A, 603 parts of dodecylphenol, and 206 parts of butyl glycol in a stainless steel reaction vessel in the presence of 4 parts of triphenylphosphine at 130° C. until an EEW of 865 g/eq is reached. In the course of cooling, the batch is diluted with 849 parts of butyl glycol and 1534 parts of D.E.R® 732 (polypropylene glycol diglycidyl ether, DOW Chemical, USA) and is reacted further at 90° C. with 266 parts of 2,2'aminoethoxy-ethanol and 212 parts of N,N-dimethylaminopropylamine. After two hours, the viscosity of the resin solution is constant (5.3 dPas; 40% in SOLVENON® PM (methoxypropanol), available from BASF AG, Germany; cone and plate viscometer at 23° C.). It is diluted with 1512 parts of butyl glycol and the base groups are partly neutralized with 201 parts of glacial acetic acid, and the product is diluted further with 1228 parts of deionized water and discharged. This gives a 60% strength aqueous-organic resin solution whose 10% dilution has a pH of 6.0. The resin solution is used in direct form for paste preparation.

Preparation D

Pigment Paste with Zirconium Oxide

A premix is first formed from 125 parts by weight of water and 594 parts by weight of the grinding resin of Preparation C. Then 7 parts by weight of acetic acid, 9 parts by weight of TETRONIC® 901, 8 parts by weight of carbon black, 26 parts by weight of zirconium oxide, 547 parts by weight of titanium dioxide TI-PURE® R 900 (DuPont, USA), 44 parts by weight of di-n-butyl tin oxide, 47 parts by weight of bismuth subsalicylate, and 120 parts by weight of ASP200 clay (Langer & Co./Germany) are added. The mixture is pre-dispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 µm and is adjusted to solids content with additional water. The obtained pigment paste has solids content: 67% by weight (1 hour at 110° C.).

Preparation E

Pigment Paste with Zinc Oxide

A premix is first formed from 125 parts by weight of water and 594 parts by weight of the grinding resin of Preparation C. Then 7 parts by weight of acetic acid, 9 parts by weight of TETRONIC®901, 8 parts of carbon black, 17 parts by weight of zinc oxide, 547 parts by weight of titanium dioxide TI-PURE® R 900 (DuPont, USA), 44 parts by weight of di-n-butyl tin oxide, 47 parts of by weight bismuth subsalicylate, and 120 parts by weight of ASP200 clay are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 µm and is adjusted to solids content with additional water. The obtained pigment paste has solids content: 67% by weight (1 hour at 110° C.).

Preparation F

Pigment Paste with Vanadium Oxide

A premix is first formed from 125 parts by weight of water and 594 parts by weight of the grinding resin of Preparation C. Then 7 parts by weight of acetic acid, 9 parts by weight of TETRONIC®901, 8 parts by weight of carbon black, 19 parts by weight of vanadium oxide, 547 parts by weight of titanium dioxide TI-PURE® R 900 (DuPont, USA), 44 parts by weight of di-n-butyl tin oxide, 47 parts by weight of bismuth subsalicylate, and 120 parts by weight of ASP200 clay are added. The mixture is pre-dispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 µm and is adjusted to solids content with additional water. The obtained pigment paste has solids content: 67% by weight (1 hour at 110° C.).

Preparation G

Pigment Paste with Yttrium Oxide

A premix is first formed from 125 parts by weight of water and 594 parts by weight of the grinding resin of Preparation C. Then 7 parts by weight of acetic acid, 9 parts by weight of TETRONIC®901, 8 parts by weight of carbon black, 23 parts by weight of yttrium oxide, 547 parts by weight of titanium dioxide TI-PURE® R 900 (DuPont, USA), 44 parts by weight of di-n-butyl tin oxide, 47 parts by weight of bismuth subsalicylate, and 120 parts by weight of ASP200 clay are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 µm and is adjusted to solids content with additional water. The obtained pigment paste has solids content: 67% by weight (1 hour at 110° C.).

Preparation H

Pigment Paste with Cobalt Oxide

A premix is first formed from 125 parts by weight of water and 594 parts by weight of the grinding resin of Preparation C. Then 7 parts by weight of acetic acid, 9 parts by weight of TETRONIC® 901, 8 parts by weight of carbon black, 17 parts by weight of cobalt oxide, 547 parts by weight of titanium dioxide TI-PURE® R 900 (DuPont, USA), 44 parts by weight of di-n-butyl tin oxide, 47 parts by weight of bismuth subsalicylate, and 120 parts by weight of ASP200 clay are added. The mixture is pre-dispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 µm and is adjusted to solids content with additional water. The obtained pigment paste has solids content: 67% by weight (1 hour at 110° C.).

Preparation I

Pigment Paste with Molybdenum Oxide

A premix is first formed from 125 parts by weight of water and 594 parts by weight of the grinding resin of Preparation C. Then 7 parts by weight of acetic acid, 9 parts by weight of TETRONIC® 901, 8 parts by weight of carbon black, 26 parts by weight of molybdenum oxide, 547 parts by weight of titanium dioxide TI-PURE® R 900 (DuPont, USA), 44 parts by weight of di-n-butyl tin oxide, 47 parts by weight of bismuth subsalicylate, and 120 parts by weight of ASP200 clay are added. The mixture is pre-dispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 µm and is adjusted to solids content with additional water. The obtained pigment paste has solids content: 67% by weight (1 hour at 110° C.).

Preparation J

Pigment Paste

A premix is first formed from 125 parts by weight of water and 594 parts by weight of the grinding resin of Preparation C. Then 7 parts by weight of acetic acid, 9 parts by weight of TETRONIC®901, 8 parts by weight of carbon black, 547 parts by weight of titanium dioxide TI-PURE® R 900 (DuPont, USA), 44 parts by weight of di-n-butyl tin oxide, 47 parts by weight of bismuth subsalicylate, and 120 parts by weight of ASP200 clay are added. The mixture is pre-dispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 μm and is adjusted to solids content with additional water. The obtained pigment paste has solids content: 67% by weight (1 hour at 110° C.).

Example 1

A bath was prepared by combining 964.4 parts by weight Preparation B, 144.8 parts by weight Preparation E, and 1290.8 parts by weight deionized water. The water and Preparation B resin emulsion are combined in a container with constant stirring, and Preparation E is added with stirring. The bath solid contents are 19% by weight.

Example 2

A bath was prepared by combining 964.4 parts by weight Preparation B, 144.8 parts by weight Preparation D, and 1290.8 parts by weight deionized water. The water and Preparation B resin emulsion are combined in a container with constant stirring, and Preparation D is added with stirring. The bath solid contents are 19% by weight.

Comparative Example 3

A bath was prepared by combining 964.4 parts by weight U32CD500 Emulsion (commercial product sold by BASF Corporation that is an emulsion of an epoxy resin having no phosphorous-containing groups), 144.8 parts by weight Preparation E, and 1290.8 parts by weight deionized water. The water and U32CD500 Emulsion are combined in a container with constant stirring, and Preparation E is added with stirring. The bath solid contents are 19% by weight.

Comparative Example 4

A bath was prepared by combining 964.4 parts by weight U32CD500 Emulsion, 144.8 parts by weight Preparation D, and 1290.8 parts by weight deionized water. The water and U32CD500 Emulsion are combined in a container with constant stirring, and Preparation D is added with stirring. The bath solid contents are 19% by weight.

Example 5

A bath was prepared by combining 964.4 parts by weight Preparation B, 144.8 parts by weight Preparation H, and 1290.8 parts by weight deionized water. The water and Preparation B resin emulsion are combined in a container with constant stirring, and Preparation H is added with stirring. The bath solid contents are 19% by weight.

Example 6

A bath was prepared by combining 964.4 parts by weight Preparation B, 144.8 parts by weight Preparation I, and 1290.8 parts by weight deionized water. The water and Preparation B resin emulsion are combined in a container with constant stirring, and Preparation I is added with stirring. The bath solid contents are 19% by weight.

Examples 1-6 are tested by coating both phosphated and bare cold rolled steel 4-inch-by-6-inch test panels at 100-225 volts (0.5 ampere) in the Example at bath temperatures from 88-98° F. (31-36.7° C.) for 2.2 minutes and baking the coated panels for 28 minutes at 350° F. (177° C.). The deposited, baked coating has a filmbuild of about 0.8 mil (20 μm). Three panels were coated for each temperature and substrate. Control panels were prepared in the same way but using U32AD500 (commercial product sold by BASF Corporation).

After baking, each panel is scribed directly down the middle and tested by corrosion test GMW15288. The description of GMW15288 is as follows: On a Monday, each panel is held at 60° C. for one hour in an air-circulating oven and is then subjected to a cold cabinet at −25° C. for 30 minutes. Following, the panels are immersed for 15 minutes in a 5 wt. % NaCl solution in water (saline solution). After removal, the panels are allowed to air dry for 75 minutes at room temperature. The panels are then transferred to a humidity cabinet (60° C., 85% humidity) with an air flow not exceeding 15 m/ft across the panel and held for 21 hours. From Tuesday to Friday, the panels are immersed again in the saline solution for 15 minutes, allowed to air dry to 75 minutes at room temperature, and then returned to the humidity cabinet (22 hours). On Saturday and Sunday the panels remain in the humidity cabinet. The entire exposure sequence from Monday to the following Monday constitutes 5 cycles. The test is then repeated for a total of 20 cycles. After completion, each panel is rinsed with water and scraped with a metal spatula. The corrosion is measured as the average of scribe width of selected points along the scribe length.

|  | Avg. mm Scribe width after 20 cycles GMW15288 |
| --- | --- |
| Control | 16.89 |
| Comparative Example 3 | 11.4 |
| Example 1 | 8.5 |
| Comparative Example 4 | 4.3 |
| Example 2 | 4.1 |

In another test, after baking, each panel is scribed directly down the middle and tested in accordance with GMW14872. The test description is as follows: For 8 hours the test panels are subjected to contaminant spray of salt solution consists of 0.5% NaCl, 0.1% $CaCl_2$ and 0.075% $NaHCO_3$ at 25° C. and 45% relative humidity (RH). Next the test panels are subjected to 49° C. and a RH of 100% for 8 hours, followed by a dry stage where panels are subjected to 60° C. at <30% RH for 8 hours. The cycle is repeated until cold rolled steel (CRS) (per SAEJ2329 CRIE, uncoated) coupons reach 3.9 gm weight loss. After completion, each panel is rinsed with water and scraped with a metal spatula. The corrosion is measured as the average of scribe width of selected points along the scribe length.

|  | Avg. scribe creep GMW14872 (after 3.9 gm wt loss) |
| --- | --- |
| Control | 14.34 |
| Example 1 | 9.37 |
| Example 5 | 8.23 |
| Example 6 | 7.11 |

Example 7

A bath was prepared by combining 964.4 parts by weight Preparation B, 144.8 parts by weight Preparation F, and 1290.8 parts by weight deionized water. The water and Preparation B resin emulsion are combined in a container with constant stirring, and Preparation F is added with stirring. The bath solid contents are 19% by weight.

Example 8

A bath was prepared by combining 964.4 parts by weight Preparation B, 144.8 parts by weight Preparation G, and 1290.8 parts by weight deionized water. The water and Preparation B resin emulsion are combined in a container with constant stirring, and Preparation G is added with stirring. The bath solid contents are 19% by weight.

Example 9

A bath was prepared by combining 964.4 parts by weight Preparation B, 144.8 parts by weight Preparation J, and 1290.8 parts by weight deionized water. The water and Preparation B resin emulsion are combined in a container with constant stirring, and Preparation J is added with stirring. The bath solid contents are 19% by weight.

Preparing Coated Panels. Both phosphated and bare cold rolled steel 4-inch-by-6-inch panels are plated from Examples 7-9 at 100-225 volts (0.5 ampere) in the Example at bath temperatures from 88-98° F. (31-36.7° C.) for 2.2 minutes and the coated panels are baked for 28 minutes at 350° F. (177° C.). The deposited, baked coating has a filmbuild of about 0.8 mil (20 μm).

The description is merely exemplary in nature and, thus, variations that do not depart from the gist of the disclosure are a part of the invention. Variations are not to be regarded as a departure from the spirit and scope of the disclosure.

What is claimed is:

1. An aqueous, cathodically electrodepositable coating composition comprising:
 a cathodically electrodepositable binder comprising:
  a resin component comprising:
   an amine-functional phosphorylated resin comprising at least one of a diphosphate ester of a polyepoxide resin, a triphosphate ester of a polyepoxide resin, and a diphosphonic acid ester of a polyepoxide resin; and
   a second amine-functional resin that is free from a phosphorous-containing group; and
  a crosslinker comprising a blocked polyisocyanate and reactive with at least one of the amine-functional phosphorylated resin and the second amine-functional resin; and
 a metal oxide selected from the group consisting of vanadium oxide, manganese oxide, cobalt oxide, zinc oxide, strontium oxide, yttrium oxide, molybdenum oxide, zirconium oxide, lanthanum oxide, oxides of the lanthanide series of elements, and combinations thereof.

2. An aqueous, cathodically electrodepositable coating composition according to claim 1, wherein the aqueous, cathodically electrodepositable coating composition is free of epoxy resins other than the amine-functional phosphorylated resin.

3. An aqueous, cathodically electrodepositable coating composition according to claim 1, wherein the metal oxide is selected from the group consisting of vanadium oxide, manganese oxide, cobalt oxide, zinc oxide, yttrium oxide, molybdenum oxide, zirconium oxide, and combinations thereof.

4. An aqueous, cathodically electrodepositable coating composition according to claim 1, wherein the metal oxide is present in the aqueous, cathodically electrodepositable coating composition in an amount of from about 0.01 part by weight to about 1 part by weight based on 100 parts by weight of the resin component.

5. An aqueous, cathodically electrodepositable coating composition according to claim 1, wherein the second amine-functional resin is reactive with the crosslinker.

6. An aqueous, cathodically electrodepositable coating composition according to claim 1, wherein the amine-functional phosphorylated resin comprises the triphosphate ester of a polyepoxide resin.

7. A method of coating a metal automotive vehicle body, the method comprising:
 (a) cleaning the metal automotive vehicle body;
 (b) placing the cleaned metal automotive vehicle body into an aqueous, cathodically electrodepositable coating composition according to claim 1;
 (c) connecting the metal automotive vehicle body as a cathode in an electric circuit and passing a current through the aqueous, cathodically electrodepositable coating composition to deposit a coating layer onto the metal automotive vehicle body.

8. A method according to claim 7, wherein the metal automotive vehicle body is free of a phosphate pre-treatment.

9. A method according to claim 7, wherein the amine-functional phosphorylated resin is at least about 5 weight percent of the cathodically electrodepositable binder.

10. A method according to claim 7, wherein the aqueous, cathodically electrodepositable coating composition comprises from about 0.01 percent by weight to about 1 percent by weight of the metal oxide based on total binder solids weight.

11. A method according to claim 7, wherein the metal oxide is selected from the group consisting of vanadium oxide, manganese oxide, cobalt oxide, zinc oxide, yttrium oxide, molybdenum oxide, zirconium oxide, and combinations thereof.

* * * * *